Figure 1:
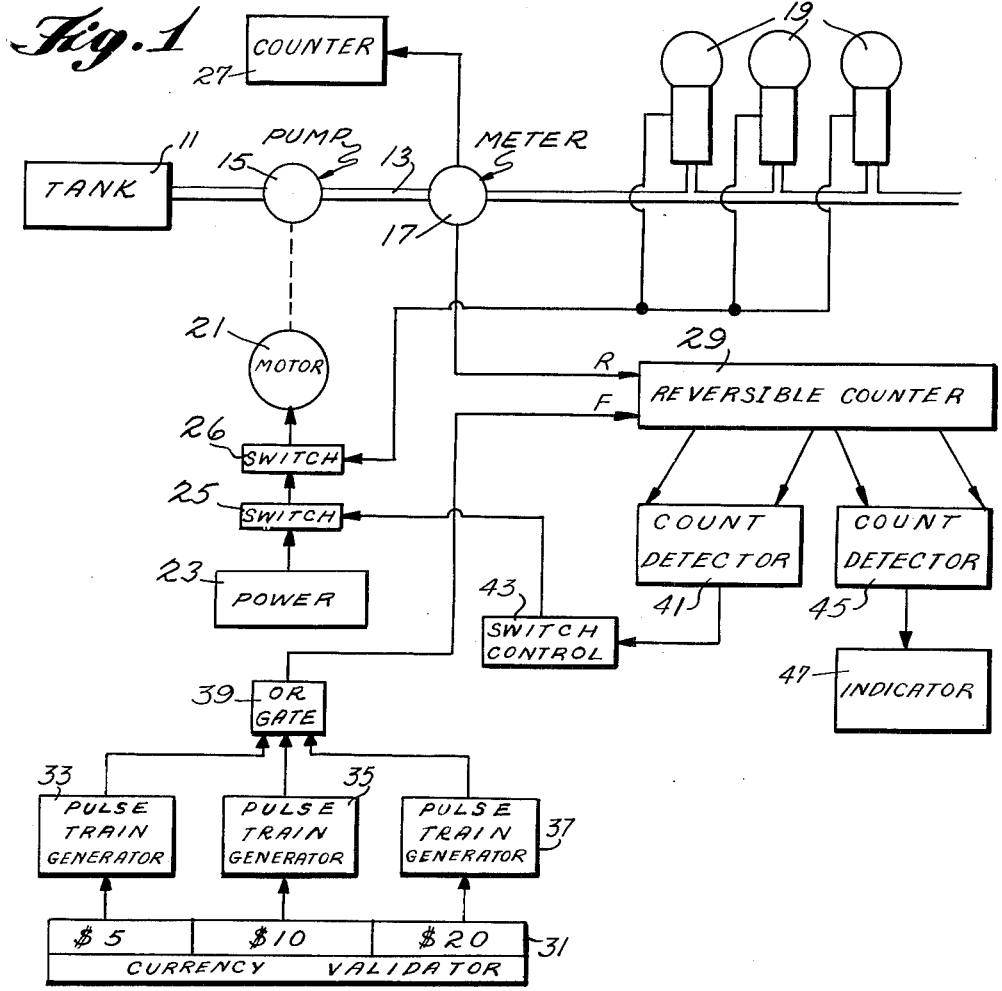

Dec. 7, 1965  G. A. KLAFFKY  3,221,860
INVENTORY CONTROL SYSTEM
Filed Oct. 3, 1962  2 Sheets-Sheet 1

United States Patent Office 3,221,860
Patented Dec. 7, 1965

3,221,860
INVENTORY CONTROL SYSTEM
George A. Klaffky, Huntington, N.Y.
Filed Oct. 3, 1962, Ser. No. 228,156
6 Claims. (Cl. 194—5)

This invention relates to inventory control systems for gasoline service stations, and more particularly to an inventory control system making use of paper currency validating machines.

A large percentage of service station operators receive gasoline on a c.o.d. basis because it is undesirable for the gasoline supplier to extend the service station operators large amounts of credit. These service stations only receive a delivery of as much gasoline as they can pay for with cash. With such an arrangement, many service stations receive deliveries of only a few hundred gallons of gasoline although their storage tanks have the capacity to receive many times this amount. When only small amounts of gasoline are delivered at a time, the cost of delivery is multiplied. For example, the cost of delivering a few hundred gallons of gasoline is as much as 1¢ per gallon, whereas if the entire 8,000 gallon complement of a tank truck could be delivered at one time, the delivery cost could be reduced to as little as an eighth of a cent per gallon.

Several systems have been proposed in the prior art to enable a gasoline supplier to deliver large quantities of gasoline to the service stations while maintaining inventory control of the gasoline until the service station has made payment. In one such system of the prior art, the supplier delivers a large amount of gasoline to the tanks of the service station but each pump is controlled by a key-actuated mechanism to dispense only a small amount of gasoline until it is again reset. Another system of the prior art permits the dispensing of controlled amounts of gasoline in response to tokens or checks. The key-operated systems suffer the disadvantage of requiring an agent of the supplier to be present each time additional gasoline is needed by the service station operator and the token or check operated systems require that the tokens or checks be sent or delivered to the service stations each time additional gasoline is to be made available.

The system of the present invention provides an inventory control system which does not have these disadvantages. In the system of the present invention, small controlled amounts of gasoline from a large amount stored in the tanks at the service station are made available to the service station operator in response to paper currency inserted in currency validating machines at the service station. The system operates in response to $5, $10 and $20 bills to make amounts of gasoline available corresponding to the wholesale price of the gasoline. The amount made available in response to each currency bill is variable by the supplier to account for price changes. With this system, the supplier can fill the tanks of the service station operator and gasoline is made available to be dispensed by the service station operator as he can pay for it. This is accomplished without the need of an agent of the supplier to go to the service station or the need of sending or delivering tokens to the service station each time additional gasoline is required by the service station operator.

Accordingly, an object of the present invention is to provide an improved inventory control system for gasoline service stations.

A further object of this invention is to provide an improved inventory control system for gasoline service stations without the need of an agent of the supplier present at the gasoline station or the delivery of tokens to the gasoline service station each time additional gasoline is required by the service station operator.

Figure 4:
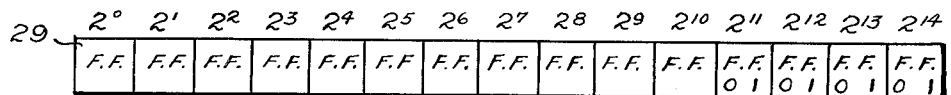
Figure 4:
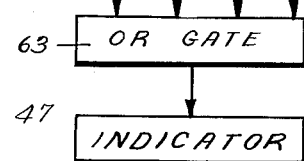
Figure 3:
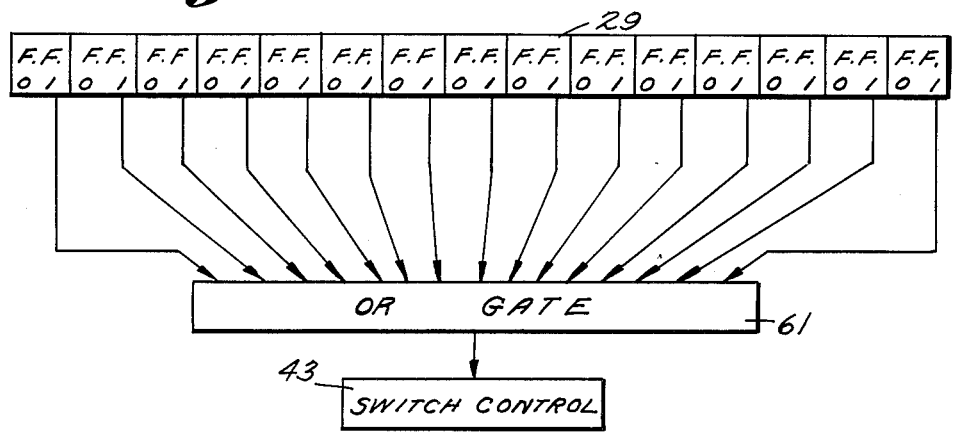
Figure 2:
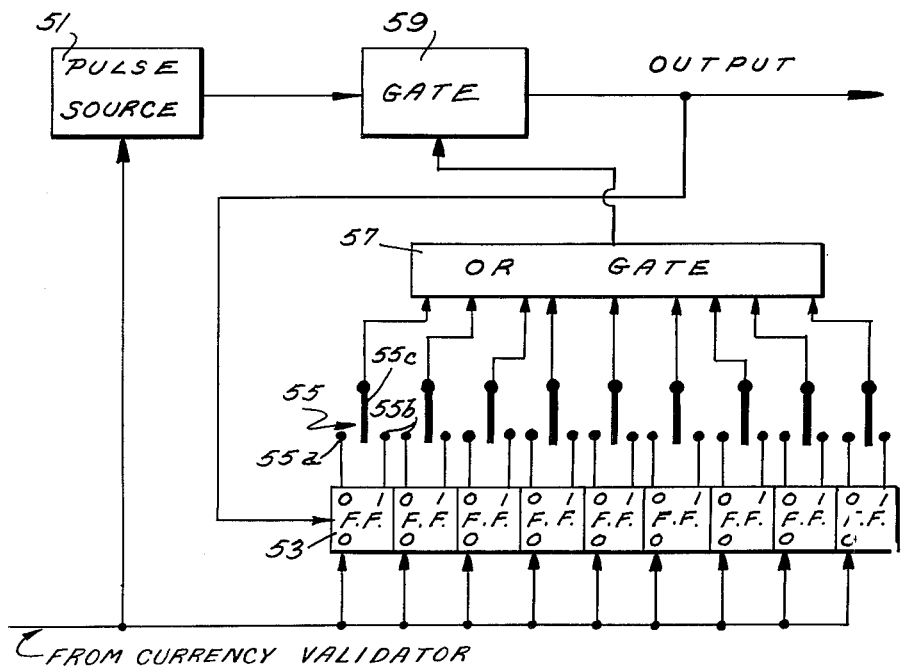

Further objects and advantages of the present invention will become readily apparent as the following detailed description of the invention unfolds and when taken in conjunction with the drawings, wherein:

FIG. 1 is a block diagram illustrating the inventory control system of the present invention; and FIGS. 2 through 4 illustrate components of the system in FIG. 1 in more detail.

In FIG. 1 the reference number 11 designates the storage tank in which large amounts of gasoline may be stored. This gasoline in the storage tank 11 is delivered through a conduit 13 through a pump 15 and a meter 17 to gasoline dispensing pumps 19. The pump 15 is driven by a motor 21 which is energized by a source of power 23 through switches 25 and 26. The switch 26 is operated in response to the actuation of any one of the gasoline dispensing pumps 19. Thus when the switch 25 is closed, the actuation of one of the pumps 19 will close a circuit between the source of power 23 and the motor 21. The motor 21 will thus be energized and drive the pump 15, which will deliver gasoline from the storage tank to the actuated dispensing pumps. Unless the switch 25 is closed allowing power from the source 23 to energize the motor 21 the pump 15 will not be driven and gasoline cannot be delivered from the tank 11 to the dispensing pumps 19. By opening and closing the switch 25 the system of the present invention makes small amounts of gasoline available in response to $5, $10 and $20 bills, thus providing the desired inventory control.

The meter 17 produces output pulses in response to gasoline flowing therethrough and produces one pulse for each tenth of a gallon of gasoline. The output pulses from the meter 17 are applied to a counter 27 which counts the pulses applied thereto and provides an indication of the total amount of gasoline delivered through the conduit 13 after the time the counter 27 was set to zero. The counter 27 is reset to zero by the supplier's agent each time a new delivery of gasoline is made to the service station so that the supplier is provided with an indication of how much gasoline was dispensed between deliveries. The pulses from the meter 17 are also applied to the reverse input of a reversible counter 29, which counts backwards in response to pulses from the meter 17. The reversible counter 29 is a binary counter comprising a plurality of flip-flop circuits, one for storing each binary bit of the count registered. It counts in a forward direction in response to pulses applied to the forward input labelled F and counts in a backward direction in response to pulses applied from the meter 17 to the reverse input labelled R. The total count in the counter 29 is represented by the states of the individual flip-flops comprising the stages of the counter 29. Such a reversible counter is fully disclosed in FIG. 1 of the patent to Steele, 2,735,005 which issued February 14, 1956.

The system is provided with a currency validator 31 which operates in response to $5, $10 and $20 bills. This currency validator may for example make use of the system disclosed in the patent to Sontheimer, No. 2,731,-621, which issued on January 17, 1956. The system would use a separate system like that disclosed in the Sontheimer patent for each bill denomination. The $5, $10 and $20 bills inserted into the validator 31 are deposited in a vault which can be opened only by the supplier. The validator 31 in response to receiving a $5 bill supplies an enabling signal to a pulse train generator 33, in response to receiving a $10 bill applies an enabling signal to a pulse train generator 35, and in response to receiving a $20 bill applies an enabling signal to a pulse train generator 37.

The pulse train generator 33, in response to receiving an enabling signal from the currency validator 31, produces a predetermined number of pulses in a train. The number of pulses produced in the train are equal to the number of tenths of gallons of gasoline which would be purchased at the supplier's wholesale price of gasoline for $5. The pulse train generator 35, in response to receiving an enabling signal from the validator 31, produces twice as many pulses as the pulse train generator 33 in a pulse train, or in other words produces the number of pulses corresponding to $10 worth of gasoline at the wholesale price. The pulse generator 37, in response to receiving an enabling signal from the validator 31, produces twice as many pulses as the pulse train generator 35 in a pulse train, or in other words the number of pulses corresponding to $20 of gasoline at the wholesale price. The output pulses from the pulse train generators 33, 35 and 37 are applied through an OR gate 39 to the forward input of the reversible counter 29. The reversible counter 29 in response to the pulses passing through the OR gate 39 counts in a forward direction and increases the count registered thereby by an amount equal to the total number of pulses applied to the forward input thereof. Thus the count registered by the reversible counter 29 will represent the number of tenths of gallons which have been purchased by the service station operator by his insertion of paper currency into the currency validator 31 minus the amount of gasoline that he has dispensed through the pumps 19. When the count in the reversible counter 29 becomes zero, indicating that all the gasoline purchased by the service station operator has been dispensed, this count will be detected by a count detector 41. In response to a zero count being registered in the reversible counter 29, the count detector 41 will apply a signal to a switch control 43, which in response thereto will open the switch 25, thus disconnecting the source of power 23 from the motor 21. As a result no more gasoline can be delivered to the dispensing pumps 19 and the service station operator will not be able to dispense any more gasoline until he deposits more paper currency in the validator 31. A second count detector 45 is provided to detect when the count registered in the counter 29 falls below a preset minimum, which conveniently may be 1024 representing 102.4 gallons. In response to the count registered in the counter 29 falling below this preset minimum, the count detector 45 applies a signal to an indicator 47 which in response thereto provides a visual indication to the service station operator. Thus the indicator 47 will indicate to the service station operator when the amount of gasoline available to him falls below a preset minimum.

FIG. 2 is a block diagram illustrating in more detail the circuitry of the pulse generators 33, 35 and 37. As shown in FIG. 2, the enabling signal from the currency validator is applied to a pulse source 51 causing the pulse source 51 to start to generate pulses. The signal from the currency validator also is applied to a binary counter 53 setting the count registered in the counter 53 to zero. The binary counter 53 is a conventional counter with each stage thereof comprising a flip-flop of the Eccles-Jordan type. In such a binary counter, each of the flip-flops will have two stable states designated as the ZERO and ONE states, and the count registered by the counter will be determined by the states of each of the flip-flops of the counter 53. The signal from the currency validator sets each of the flip-flops of the counter 53 in their ZERO states so that the count registered by the counter 53 will be zero immediately after the signal from the currency validator is applied thereto. Each of the flip-flops of the counter 53 is provided with two outputs. One output referred to as the ZERO output will be at a high voltage when the flip-flop is in its ZERO state and will be at a low voltage when the flip-flop is in its ONE state. The other output of the flip-flop called the ONE output will be at a low voltage when the flip-flop is in its ZERO state and will be at a high voltage when the flip-flop is in its ONE state. A plurality of switches 55 are provided each connected to the outputs of a different one of the flip-flops of the counter 53. The switches 55 are single-pole double-throw switches and have one contact 55a connected to the ZERO output of the corresponding flip-flop of the counter 53 and one contact 55b connected to the ONE output of the corresponding flip-flop of the counter 53. Each switch 55 has a pole 55c which in one position engages its contact 55a and in the other position engages its contact 55b. The poles 55c of the switches 55 are all connected to inputs of an OR gate 57, the output of which is applied to a gate 59. The switch 55 will thus connect the ONE or ZERO output of each of the flip-flops of the counter 53 to an input of the OR gate 57. Each of the switches 55 may be operated individually so that some of the switches 55 may connect the ZERO outputs of the corresponding flip-flops to inputs of the OR gate 57 and some of the switches 55 may connect the ONE outputs of the corresponding flip-flops to inputs of the OR gate 57. With this arrangement all the flip-flops will apply a low voltage to the OR gate 57 only when one specific count is registered in the counter 53 if the position of none of the switches 55 is changed. This specific count is predetermined by the position of the switches 55 and any number throughout the counting range of the counter 53 can be selected as the specific count simply by selecting the proper positions for each of the switches 55. The voltages applied to the OR gate 57 by the flip-flops of the counter 53 are passed to the gate 59 so that the OR gate 57 will apply a high voltage to the gate 59 unless it receives low voltages from all of the flip-flops of the counter 53. Thus the OR gate 57 will apply a high voltage to the gate 59 unless the count registered by the counter 53 is the predetermined count selected by the switches 55 at which the flip-flops of the counter 53 all apply low voltages to the OR gate 57. Pulses from the pulse source 51 are applied to the gate 59, which will pass these pulses to its output as long as it receives a high voltage from the OR gate 57. The pulses passing through the gate 59 are the output pulses of the pulse train generator and are applied to the forward input of the reversible counter 29. The pulses passing through the gate 59 are also applied to the counter 53 to be counted thereby. Thus when an enabling signal is applied to the pulse train generator, the count registered in the counter 53 will be set to zero and the pulse source 51 will begin applying pulses to the gate 59. The OR gate 57 will at this time apply a high voltage to the gate 59 unless the predetermined count selected by the switches 55 is zero. Therefore the pulses from the source 51 will pass through the gate 59 and will be applied to the forward input of the reversible counter 29. The pulses passing through the gate 59 are also counted by the counter 53 and the count registered by the counter 53 will therefore increase until it reaches the predetermined count selected by the switches 55. At this time the OR gate 57 will no longer apply a high voltage to the gate 59 and the pulses from the source 51 will no longer pass through the gate 59 and be applied to the forward input of the counter 29. Thus the number of pulses applied to the forward input of the reversible counter 29 will be the predetermined count selected by the switches 55. In this manner the supplier to the service station, by positioning the switches 55, can select the number of pulses that each of the pulse generators 33, 35 and 37 will apply to the forward input of the reversible counter 29 in response to an enabling signal from the currency validator 31 and thus the supplier can adjust the number of pulses applied to the reversible counter 29 in accordance with variations in the wholesale price of the gasoline delivered by the supplier. The pulse source 51 is designed to shut itself off after a time delay sufficient to generate more pulses than the highest count that can be registered by the counter 53.

The count detectors 41 and 45 are similar to the circuitry shown in FIG. 2 comprising the switches 55 and the OR gate 57 except that since the count detectors 41 and 45 do not need to detect variable counts, permanent connections replace the switches 55 from the properly selected outputs of the flip-flops of the reversible counter 29. FIG. 3 illustrates the count detector 41 and how it is connected to the flip-flops of the reversible counter 29. As shown in FIG. 3, the count detector 41 comprises an OR gate 61 having its inputs connected to the one outputs of each of the flip-flops of the counter 29. Thus the flip-flops of the counter 29 will all apply a low voltage to the OR gate 61 only when the count registered by the counter 29 is zero. The OR gate 61 will apply a high voltage to the switch control 43 unless it receives a low voltage from all of the flip-flops of the counter 29 and therefore the OR gate 61 will apply a high voltage to the switch control 43 unless the count registered by the counter 29 is zero, in which case the OR gate 61 will apply a low voltage to the switch control 43. The switch control 43 closes the switch 25 in response to receiving a high voltage from the OR gate 61 and will open the switch 25 in response to receiving a low voltage from the OR gate 61. Thus the switch control 43 will maintain the switch 25 closed until the count registered by the reversible counter 29 is zero.

FIG. 4 illustrates the count detector 45. As shown in FIG. 4, the count detector 45 comprises an OR gate 63, the inputs of which are connected to the one outputs of the flip-flops of the counter 29 which represent binary digits of the $2^{11th}$ order and higher. These flip-flops of the counter 29 will all be in their zero states only when the count registered by the counter 29 falls below 1024 and therefore will apply low voltages to the OR gate 63 only when the count registered by the counter 29 falls below 1024. The OR gate 63 will apply a high voltage to the indicator 47 if it receives at least one high voltage from one of the flip-flops of the counter 29 to which it is connected, and will apply a low voltage to the indicator 47 only if it receives low voltages from all of the flip-flops of the counter 29 to which it is connected. Thus the OR gate 63 will apply a high voltage to the indicator 47 when the count registered by the counter 29 is 1024 or greater and will apply a low voltage to the indicator 47 when the count registered by the counter 29 is below 1024. The indicator 47 will provide a visual indication to the service station operator when it receives a low voltage from the OR gate 63 and thus will indicate to the operator of the service station when the count registered by the counter 29 falls below 1024, signifying that he has only 102.4 gallons still available to be dispensed without additional currency being inserted into the currency validator 31.

Thus there is provided an inventory control system which permits the supplier to make available to the service station operator only that amount of gasoline which he is able to pay for with cash even though a much larger amount of gasoline is stored in the tanks of the service station operator, and this inventory control is achieved without requiring an agent of the supplier to go to the service station or without delivering or sending tokens or the like to the service station each time additional gasoline is to be made available to the service station operator. The above description is of a specific embodiment of the inventory control system of the present invention, and many modifications may be made thereto without departing from the spirit and scope of the invention, which is defined in the appended claims.

What is claimed is:

1. An inventory control system comprising gasoline storage means, a plurality of gasoline dispensers each selectively operable to dispense portions of the amount of gasoline available thereto, and means to make a predetermined amount of the gasoline in said storage means available to all of said dispensers in response to receiving a paper currency bill, said last mentioned means including means to selectively vary said predetermined amount that said last mentioned means makes available in response to receiving a paper currency bill.

2. An inventory control system comprising gasoline storage means, gasoline dispensing means selectively operable to dispense portions of the amount of gasoline available thereto, means to make a predetermined amount of the gasoline in said storage means available to said dispensing means in response to receiving paper currency and to produce a signal only when the amount of gasoline available to said dispensing means without the insertion of additional currency falls below a predetermined minimum, and means to provide an indication in response to the presence of said signal.

3. An inventory control system comprising gasoline storage means, a plurality of gasoline dispensers each selectively operable to dispense portions of the amount of gasoline available thereto, and means operable to make a first predetermined amount of the gasoline in said storage means available to all of said gasoline dispensers, to increase the amount of the gasoline in said storage means available to all of said gasoline dispensers by a second predetermined amount in response to receiving a paper currency bill, and to decrease the amount of the gasoline in said storage means available to all of said dispensers by the amount of gasoline dispensed thereby, said last mentioned means including means to selectively vary said second predetermined amount that said last mentioned means makes available in response to receiving a paper currency bill.

4. An inventory control system comprising gasoline storage means, gasoline dispensing means selectively operable to dispense portions of the amount of gasoline available thereto, means operable to make a predetermined amount of the gasoline in said storage means available to said dispensing means, to increase the amount of the gasoline in said storage means available to said dispensing means by a predetermined amount in response to receiving paper currency, and to decrease the amount of the gasoline in said storage means available to said dispensing means by the amount of gasoline dispensed thereby, said last mentioned means including means to produce a signal only when the amount of gasoline available to said dispensing means without the insertion of additional currency falls below a predetermined minimum and means to provide an indication in response to the presence of said signal.

5. A gasoline dispensing system comprising gasoline storage means for storing a body of gasoline, a plurality of gasoline dispensing pumps each selectively operable to dispense portions of the amount of gasoline available thereto, control means operable to make an amount of the gasoline from said body in said storage means available to said gasoline dispensing pumps, to increase the amount of gasoline from said body in said storage means available to said dispensing pumps by a predetermined amount in response to receiving a five dollar bill, to increase the amount of the gasoline from said body in said storage means available to said dispensing pumps by twice said predetermined amount in response to receiving a ten dollar bill, to increase the amount of the gasoline from said body in said storage means available to said dispensing pumps by four times said predetermined amount in response to receiving a twenty dollar bill, and to decrease the amount of the gasoline from said body in said storage means available to said dispensing pumps by the amount of gasoline dispensed thereby, said control means including means to indicate when the amount of gasoline available to said dispensing pump without the insertion of additional currency falls below a predetermined minimum, and means to selectively vary said predetermined amount by which said control means increases the amount made available to said dispensing pumps in response to receiving a five dollar bill.

6. A gasoline dispensing system comprising gasoline storage means for storing a body of gasoline, a plurality of gasoline dispensing pumps each selectively operable to dispense portions of the amount of gasoline available thereto, control means operable to make an amount of the gasoline from said body in said storage means available to said gasoline dispensing pumps, to increase the amount of gasoline from said body in said storage means available to said dispensing pumps by a predetermined amount in response to receiving a five dollar bill, to increase the amount of the gasoline from said body in said storage means available to said dispensing pumps by twice said predetermined amount in response to receiving a ten dollar bill, to increase the amount of gasoline from said body in said storage means available to said dipsensing pumps by four times said predetermined amount in response to receiving a twenty dollar bill, and to decrease the amount of the gasoline from said body in said storage means available to said dispensing pumps by the amount of gasoline dispensed thereby, and means to selectively vary said predetermined amount that said control means increases the amount made available to said dispensing pumps in response to receiving a five dollar bill.

References Cited by the Examiner
UNITED STATES PATENTS

| | | |
|---|---|---|
| 1,620,606 | 3/1927 | McElwain 116—118 |
| 2,247,480 | 7/1941 | Damon 194—66 |
| 2,445,291 | 7/1948 | Kamm et al. 222—14 |
| 2,731,621 | 1/1956 | Sontheimer 209—111.5 |
| 2,848,140 | 8/1958 | Gabrielsen 222—2 |
| 2,932,392 | 4/1960 | Burtner 194—4 |
| 2,951,164 | 8/1960 | Timms 194—4 |
| 3,030,015 | 4/1962 | Wieslander. |
| 3,055,549 | 9/1962 | McGaughey 222—2 |
| 3,109,559 | 11/1963 | Wilburn 194—13 |

SAMUEL F. COLEMAN, *Primary Examiner.*

WILLIAM B. LABORDE, *Examiner.*

UNITED STATES PATENT OFFICE
CERTIFICATE OF CORRECTION

Patent No. 3,221,860                                        December 7, 1965

George A. Klaffky

It is hereby certified that error appears in the above numbered patent requiring correction and that the said Letters Patent should read as corrected below.

In the grant, lines 1 to 3, for "George A. Klaffky, of Huntington, New York, " read -- George A. Klaffky, of Huntington, New York, assignor to Socony Mobil Oil Company, Inc., a corporation of New York, --; line 12, for "George A. Klaffky, his heirs" read -- Socony Mobil Oil Company, Inc., its successors --; in the heading to the printed specification, line 3, for "George A. Klaffky, Huntington, N. Y." read -- George A. Klaffky, Huntington, N. Y., assignor to Socony Mobil Oil Company, Inc., a corporation of New York --.

Signed and sealed this 6th day of December 1966.

(SEAL)

Attest:

ERNEST W. SWIDER                                   EDWARD J. BRENNER

Attesting Officer                                            Commissioner of Patents